(12) United States Patent
Kolodji

(10) Patent No.: US 10,898,846 B1
(45) Date of Patent: Jan. 26, 2021

(54) METHOD AND SYSTEM FOR CO2 CAPTURE FROM FLUE GAS AND DISTRIBUTED FOR AGRICULTURAL PURPOSES

(71) Applicant: Brian Kolodji, Bakersfield, CA (US)

(72) Inventor: Brian Kolodji, Bakersfield, CA (US)

(73) Assignee: Black Swan, LLC, Bakersfield, CA (US)

( * ) Notice: Subject to any disclaimer, the term of this patent is extended or adjusted under 35 U.S.C. 154(b) by 147 days.

(21) Appl. No.: 16/355,284

(22) Filed: Mar. 15, 2019

Related U.S. Application Data

(63) Continuation-in-part of application No. 16/235,891, filed on Dec. 28, 2018.

(60) Provisional application No. 62/611,788, filed on Dec. 29, 2017.

(51) Int. Cl.
*A01G 7/02* (2006.01)
*A01G 9/26* (2006.01)
*F17C 7/04* (2006.01)
*B01D 53/00* (2006.01)

(52) U.S. Cl.
CPC .............. *B01D 53/002* (2013.01); *A01G 7/02* (2013.01); *B01D 2256/22* (2013.01); *B01D 2257/504* (2013.01); *B01D 2258/0283* (2013.01)

(58) Field of Classification Search
CPC ......... A01G 7/02; C01B 32/50; B01D 53/265
See application file for complete search history.

(56) References Cited

U.S. PATENT DOCUMENTS

| | | |
|---|---|---|
| 4,073,089 A | 2/1978 | Maginnes et al. |
| 5,682,709 A | 11/1997 | Erickson |
| 6,108,967 A | 8/2000 | Erickson |
| 6,237,284 B1 | 5/2001 | Erickson |
| 7,842,264 B2 | 11/2010 | Cooper et al. |
| 8,197,857 B2 | 6/2012 | Dressler et al. |
| 8,252,091 B2 | 8/2012 | Anand et al. |
| 8,595,020 B2 | 11/2013 | Marino |

(Continued)

OTHER PUBLICATIONS

C. Maidana et al., Reduction of Fuel Consumption and Emissions of a Gas Turbine by Using of Oxygen-Enriched Combustion, 2nd Oxyfuel Combustion Conference.

(Continued)

*Primary Examiner* — Cabrena Holecek
(74) *Attorney, Agent, or Firm* — James M. Duncan; Scanlon Duncan LLP

(57) ABSTRACT

The flue gas extraction system provides extraction, collection, dilution, cooling, and distribution of flue gas from a vent stack of a stationary flue gas generator. The collected flue gas is processed through the system to achieve optimal temperature, pressure, flowrate, and water content for application to plants for increasing plant productivity and sequestering the carbon dioxide. The processed flue gas may be enriched with additional carbon dioxide and/or have nutrients added to it to realize a gas concentration which, when applied to plants, promotes the growth, health and productivity of the plants. Application of carbon dioxide may be supplemented by providing additional components to the plants which maintain a level of fertilization and irrigation suitable for the increased biomass and water utilization efficiency of the plants resulting from the increased intake of carbon dioxide.

8 Claims, 9 Drawing Sheets

(56) References Cited

U.S. PATENT DOCUMENTS

| | | |
|---|---|---|
| 8,852,319 B2 | 10/2014 | Wijmans et al. |
| 8,889,400 B2 | 11/2014 | Martin et al. |
| 9,266,057 B1 | 2/2016 | Jones |
| 9,433,887 B2 | 9/2016 | Wijmans et al. |
| 9,433,896 B2 | 9/2016 | Eisenberger |
| 9,514,493 B2 | 12/2016 | Marino |
| 10,687,477 B1 * | 6/2020 | Kolodji .................... F17C 7/04 |
| 2010/0205960 A1 | 8/2010 | McBride et al. |
| 2011/0195473 A1 | 8/2011 | Wilhelm |

OTHER PUBLICATIONS

B.A. Kimball et al. Effects of Increasing Atmospheric CO2 on Vegetation printed in CO2 and Biosphere by J. Rozema et al. at p. 65, Kluwer Academic Publishers, 1993.

T. Brinkman, Theoretical and Experimental Investigations of Flat Sheet Membrane Module Types for High Capacity Gas Separation Applications, Chemie Ingenie Technik, vol. 85, Issue 8, pp. 1210-1220, May 17, 2013.

B. A. Kimball et al, Seventeen Years of Carbon Dioxide Enrichment of Sour Orange Trees: Final Results, Global Change Biology (2007) 13, 2171-2183.

T.C. Merkel et al, Power Plant Post-Combustion Carbon Dioxide Capture: An Opportunity for Membranes, Journal of Membrane Science 359 (2010) 126-139.

* cited by examiner

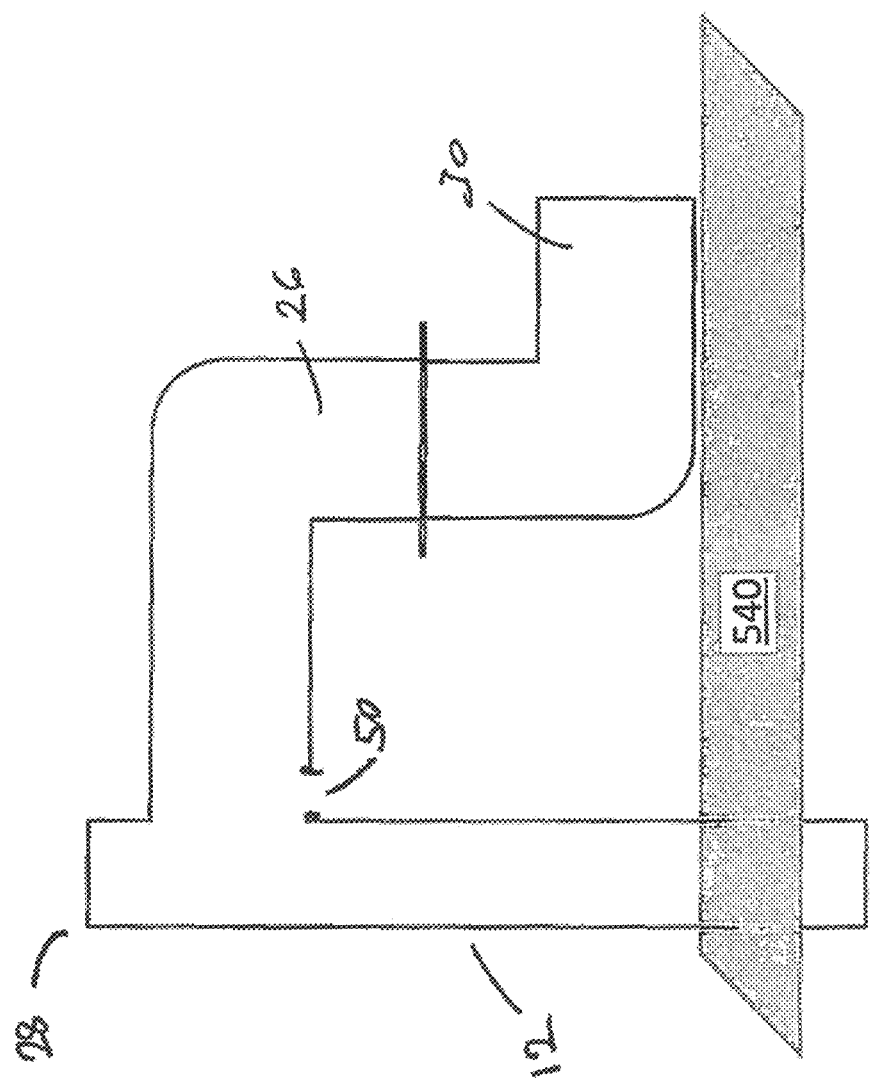

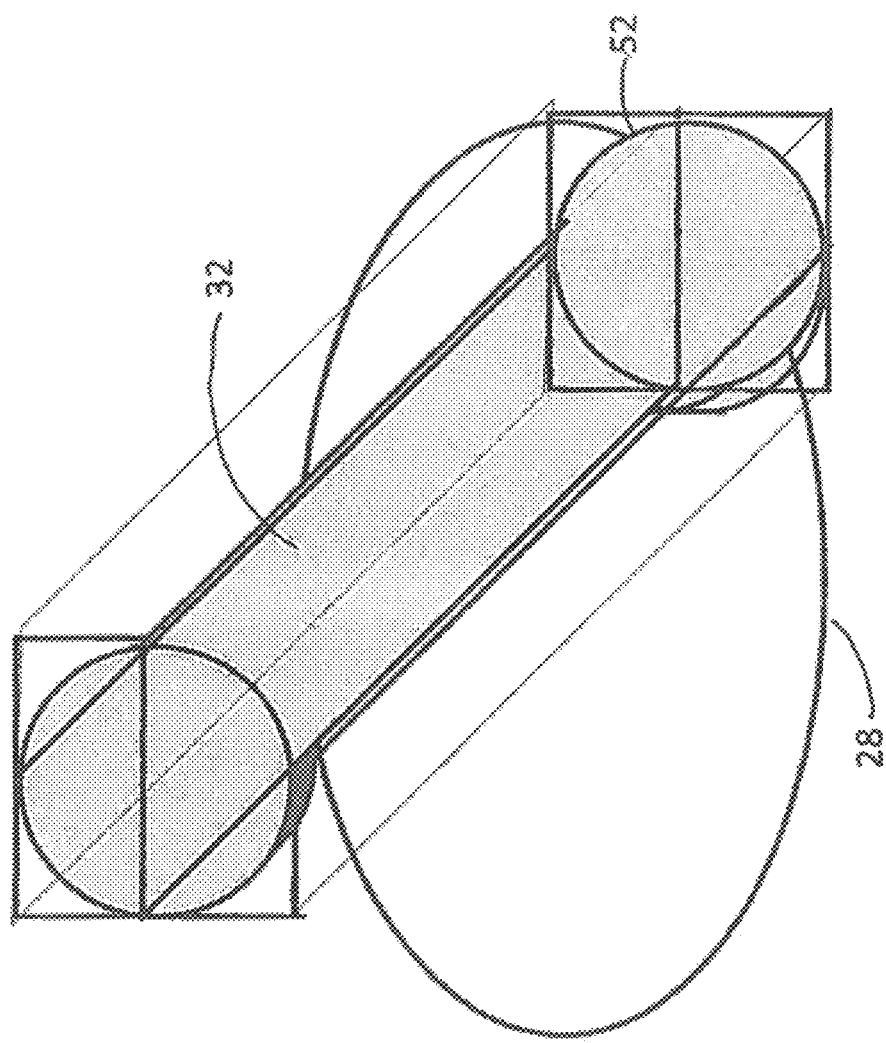

METHOD AND SYSTEM FOR CO2 CAPTURE FROM FLUE GAS AND DISTRIBUTED FOR AGRICULTURAL PURPOSES

RELATED APPLICATIONS

This is a continuation-in-party application claiming domestic priority to U.S. provisional application 62/611,788 filed Dec. 29, 2017 and to U.S. patent application Ser. No. 16/235,891 filed Dec. 28, 2019.

BACKGROUND OF THE INVENTION

This invention relates to capturing carbon dioxide ($CO_2$) and making beneficial use of the captured gas. This invention more specifically relates to capturing carbon dioxide from flue gas and distributing and applying a cooled and diluted flue gas to agricultural crops to promote an increase in crop yield per harvest, to improve the size and quantity of fruit, to provide more robust root and shoot systems, and/or improve the productivity by allowing earlier harvests or multiple harvests.

Global warming is a result of increasing concentrations of greenhouse gases (GHG) in the atmosphere. Among the primary greenhouse gases are water vapor, carbon dioxide, methane, nitrous oxide, perfluorocarbons, hydrofluorocarbons, and sulfur hexafluoride. Of these, carbon dioxide is the primary anthropogenic (i.e, manmade) greenhouse gas, accounting for a substantial portion of the human contribution to the greenhouse effect in recent years. The chemical reactions associated with fossil fuels (such as combustion) are a major source of anthropogenic carbon dioxide, where, for example, combustion occurs in mobile and stationary devices.

A flue gas generator is a stationary (non-mobile) device which normally emits elevated concentrations of carbon dioxide to atmosphere within the flue gas stream. Examples of stationary flue gas generators are industrial steam generators, power plants, syngas plants, ethanol plants, amine regenerators, fermenters, residential water heaters, and heater furnaces.

Flue gas is generally the chemical reaction (example combustion) product of a hydrocarbon fuel and air. The hydrocarbon fuel may be natural gas, propane, gasoline, biomass, coal, and other fuels. Flue gas contains a significant percentage—e.g., 5% or 50,000 parts-per-million by volume—of carbon dioxide, relative to only a few hundred (~400) parts-per-million by volume (ppmv) carbon dioxide in the atmosphere. By way of comparison, it is noted that dry air is composed of approximately 79 percent nitrogen, approximately 21 percent oxygen, water content which is usually under 10 percent and other trace components in the parts per million, including carbon dioxide at between 300 to 400 ppm.

Given the significant $CO_2$ contained in flue gas, these emissions are regulated by the United States Environmental Protection Agency and various state statutory schemes. Under the Federal regulations, emissions standards are set for new flue gas sources, which require some carbon capture and sequestration, while each state is directed to submit plans to the EPA showing how emission reduction goals will be achieved (e.g., cap-and-trade under California SB 32).

Given the recent requirements to control $CO_2$ emissions in flue gas, proposed solutions for capturing carbon dioxide from flue gas are abundant. However, it is noted that the currently proposed systems and methods are complex, energy intensive, and costly. These systems and methods generally employ concentration and purification to achieve $CO_2$ capture and rely upon conventional long-term permanent underground sequestration to store the $CO_2$ until a use can be found. Direct chemical reaction products, for example from combustion, resulting in flue gas contain elevated levels of carbon dioxide (usually under 10 percent) and water (usually under 30 percent). Another reaction product contained in flue gas is the relatively inert nitrogen which passes through the flue gas generator with any excess unreacted oxygen.

Combustion products of a flue gas generator are produced at an elevated temperature, usually from a firing chamber operating at hundreds of degrees Fahrenheit, and at low pressures (usually near atmospheric), before passing into a venting stack for emission to atmosphere. Because these emissions are highly regulated, treatment technology is employed to reduce contaminants CO, NOX, particulates, and VOCs to acceptable levels, but $CO_2$ has not been regulated until recently. Thus, with existing flue gas generators, the flue gas is vented freely and in an elevated fashion to atmosphere sending out billions of tons per year of clean usable $CO_2$, unfortunately contributing to global warming.

With respect to atmospheric air, flue gases can have relatively high temperature, similar pressure, high water concentration and have a relatively high carbon dioxide concentration. Because the sources of flue gas are ubiquitous, capturing even a modest portion of the carbon dioxide from flue gas yields meaningful results in decreasing carbon dioxide releases to the atmosphere. However, many of the systems proposed for separation, concentration and capture of carbon dioxide from flue gas, such as absorption, adsorption, cryogenic distillation, and membrane separation, can be complicated and energy intensive, making the proposed systems positive greenhouse gas contributors. These systems can also be very expensive.

Once the carbon dioxide is captured, there remains the question of sequestration. A commonly used sequestration method is to store carbon dioxide underground until a productive and non-harmful use can be found. Unfortunately, this "solution" merely provides a delay rather than safe consumption of the $CO_2$.

The disclosed system efficiently, effectively, and inexpensively captures carbon dioxide from flue gas leaving a negative effect on greenhouse gas contributions which, in comparison to other proposed solutions, is more easily implemented and makes a beneficial use of the captured carbon dioxide, turning the substance into a highly desirable commodity

SUMMARY OF THE INVENTION

Embodiments of the method and apparatus disclosed herein provide a solution to the problems described above. The present invention provides extraction, collection, cooling, distribution, and dilution of the $CO_2$ in flue gas from a vent stack of a stationary flue gas generator which, when applied to plants in a controlled manner, promotes the growth, health and productivity of the plants. The collected flue gas is processed through the system to achieve optimal temperature, pressure, flowrate, and $CO_2$ and water content. In addition, the processed flue gas may be further enriched with carbon dioxide and/or have nutrients added to it to realize a more beneficial gas concentration. Application of carbon dioxide may be supplemented by providing additional components directly to the plants which maintain a level of fertilization and irrigation suitable for the increased biomass (including yield of crop) and water utilization efficiency resulting from the increased intake of carbon dioxide by the plants.

BRIEF DESCRIPTION OF THE DRAWINGS

FIG. 5 shows greater detail for an embodiment of a lower or an intermediate extraction device and the structure supporting the same.

FIG. 6 depicts an embodiment of an upper extraction device and structure supporting the same.

DETAILED DESCRIPTION OF THE EMBODIMENTS

An embodiment of the disclosed system is utilized in combination with a venting stack of a stationary flue gas generator. The stack may be the existing stack and/or a stack which has been modified by adding additional structural components.

Alternatively, a replacement stack having integral structural components may be added to a flue gas generator. Embodiments of the invention comprise structural components which (1) extract flue gas derived from a gas stream emitted through the venting stack; (2) condition the extracted stream by cooling and/or diluting it; (3) deliver the conditioned extracted stream at a pressure and flowrate to a field distribution system; and (4) distribute the conditioned extracted stream to create a suitable biosphere concentration of carbon dioxide to an open agricultural field to benefit a plurality of plants with the biosphere concentration local to the agricultural field generally held between 600 to 1200 part per million by volume (0.06 and 0.12%) CO2.

Figure 1:
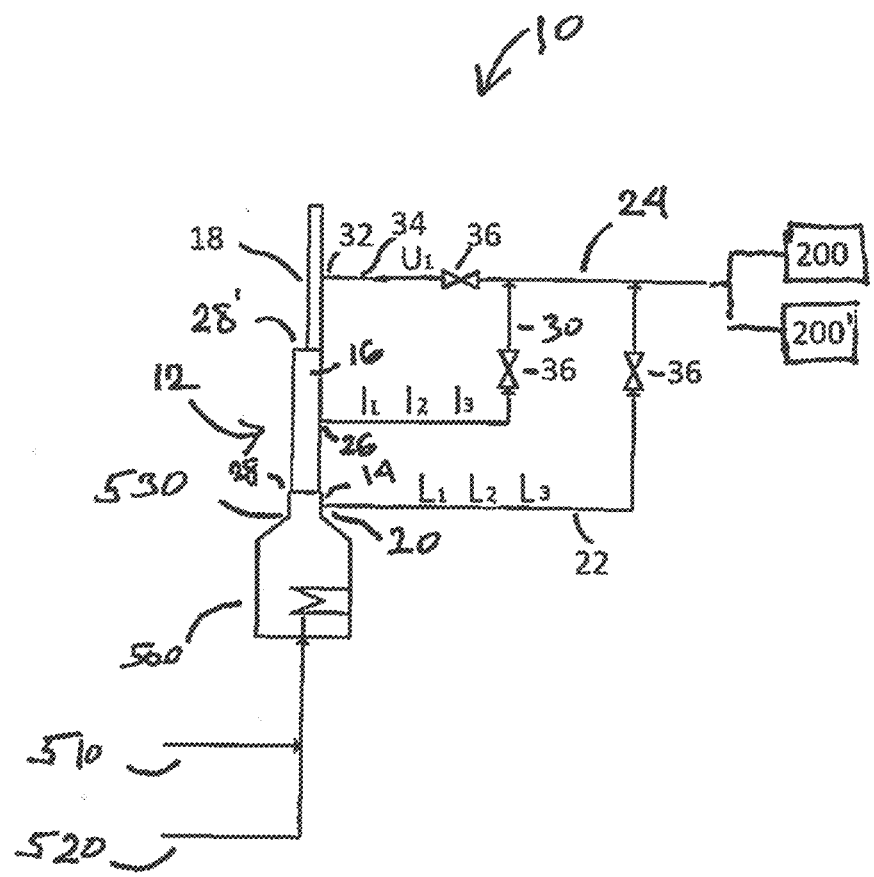
FIG. 1 shows an embodiment of a flue gas generator and embodiments of piping configurations which provide multiple extraction device options for extraction of at least a portion of the flue gas from the flue gas generator.

As indicated in FIG. 1, an embodiment of the system for CO2 capture from a flue gas generator system 10 is utilized in combination with a venting stack 12, modified as necessary, of a stationary flue gas generator 500 to capture carbon dioxide from the gas stream emitted through the stack and distribute the carbon dioxide to an agricultural field containing a plurality of plants. Flue gas generator 500 is generally a device which receives air from an air source 510 and fuel from a fuel source 520 for a combustion process, where the combustion process generates flue gas.

The flue gas generator 500 may have an original stack base 530 which, but for the present system, would vent flue gas to the atmosphere through stack tip 28. Embodiments of the system 10 may comprise modifying flue gas generator 500 with venting stack 12 having a stack base 14 which may be modified to accommodate embodiments of the present invention, such as a full pipe section 16 and/or a partial pipe section 18. Embodiments of the flue gas generator system 10 may have a lower gas extraction device 20 which is attached to the stack base 14. The lower gas extraction device 20 is configured to receive all or at least a portion of the gas stream flowing from the flue gas generator 500 and directs all or the portion of the gas stream into a first conduit 22 connected to the lower gas extraction device 20. The lower gas extraction device 20 will receive substantially all of the gas stream flowing through the venting stack 12 if the venting stack is close-ended with a lid at new stack tip 28' (which may be hinged to allow opening and closing) or some other closing apparatus and there are no other extraction devices, leaving the gas stream nowhere else to flow but into the lower gas extraction device. This theoretical gas stream is depicted in FIG. 1 as gas stream $L_1$, where "L" is used to indicate that this gas stream flows out through the lower extraction device 20 of the venting stack 12. In this case, pressure and flow monitoring and control devices (not shown) may be needed and installed on the stack base 14 to maintain the pressure inside of the flue gas generator 500.

If the modified venting stack 12 is open to the atmosphere, the gas stream flowing into the lower extraction device 20 may be diluted by air drawn in from the atmosphere, to form a first diluted gas stream $L_2$ flowing through the lower gas extraction device 20 and into the first conduit 22. In this situation, the gas stream flowing into the lower extraction device 20 is indicated as $L_2$ rather than $L_1$ There may be additional extraction devices which reduce the gas stream flowing through the lower gas extraction device 20 by providing other outlets from venting stack 12. Such a reduced gas stream flowing through lower extraction device 20 is identified as third gas stream $L_3$, which is in place of gas flow streams of $L_1$ or $L_2$ The first conduit 22 discharges the extracted gas (either $L_1$, $L_2$, or $L_3$) into a main duct 24. If the venting stack 12 is open to the atmosphere, and in the absence of other extraction devices, any gas which does not flow through the lower gas extraction device flows out of either existing stack tip 28 or new stack tip 28'.

As further depicted in FIG. 1, an embodiment of the invention may also have an intermediate gas extraction device 26 which is attached to the full pipe section 16 of the venting stack 12. The intermediate gas extraction device 26 can either be in addition to the lower gas extraction device 20 or it can be used instead of the lower gas extraction device. The intermediate gas extraction device 26 is connected to main duct 24 by second conduit 30.

The intermediate gas extraction device 26 can be configured to receive the entire gas stream flowing through the venting stack 12. The intermediate gas extraction device 26 would receive all of the gas flowing through the venting stack if the venting stack is close-ended and there are no other extraction devices. This theoretical gas stream is depicted in FIG. 1 as gas stream I1, where "I" is used to indicate that this gas stream flows out through the intermediate extraction device 26 of the venting stack 12.

In another configuration of the system having the intermediate gas extraction device 26, if the venting stack is open to the atmosphere (i.e., having either an open stack or having a gap disposed between the stack base 14 and new stack tip 28') the gas stream flowing out through the intermediate gas extraction device will be diluted by air drawn in from the atmosphere through either the open new stack tip 28' and/or through the gap. In this situation, the gas stream flowing into the intermediate gas extraction device 26 is indicated as $I_2$ rather than $I_1$.

There may be additional extraction devices which reduce the gas stream flowing through the intermediate gas extraction device 26 by providing other outlets from venting stack 12, such as lower extraction device 20 discussed above. Such a reduced gas stream flowing through intermediate extraction device 26 is identified as third gas stream $I_3$, which is in place of gas flow streams of $I_1$ or $I_2$ The second conduit 30 discharges the extracted gas (either $I_1$, $I_2$, or $I_3$) into main duct 24. If the venting stack 12 is open to the atmosphere, and in the absence of other extraction devices, any gas which does not flow through the intermediate gas extraction device 26 flows out of the new stack tip 28'.

As further depicted in FIG. 1, an embodiment of the invention may also have an upper gas extraction device 32 which is attached to the partial pipe section 18 of the venting stack 12. The upper gas extraction device 32 can be combined with either or both of lower gas extraction device 20 and the intermediate gas extraction device 26 or it can be used as the sole gas extraction device. The upper gas extraction device 32 is connected to main duct 24 by third conduit 34. Upper gas extraction device 32 is open to the atmosphere and may combine a portion of flue gas flowing through the venting stack 12 with air drawn in from the atmosphere, resulting in a gas stream $U_1$ flowing through the upper extraction device 32 through third conduit 34 to main duct 24.

Figure 2:
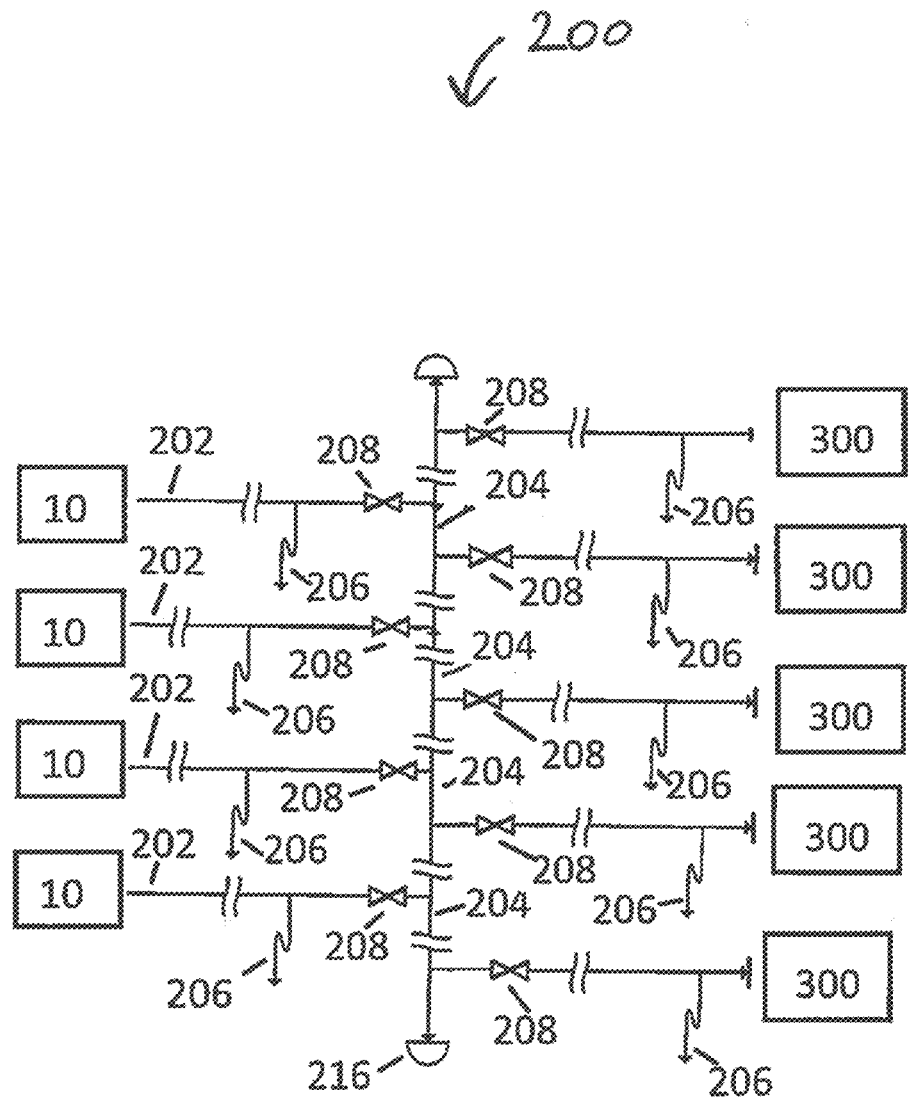
FIG. 2 shows an embodiment of a flue gas receiving station which receives the portion of flue gas captured with a configuration option depicted in FIG. 1, where the flue gas receiving station divides, dewaters and distributes the received flue gas
Figure 2A:
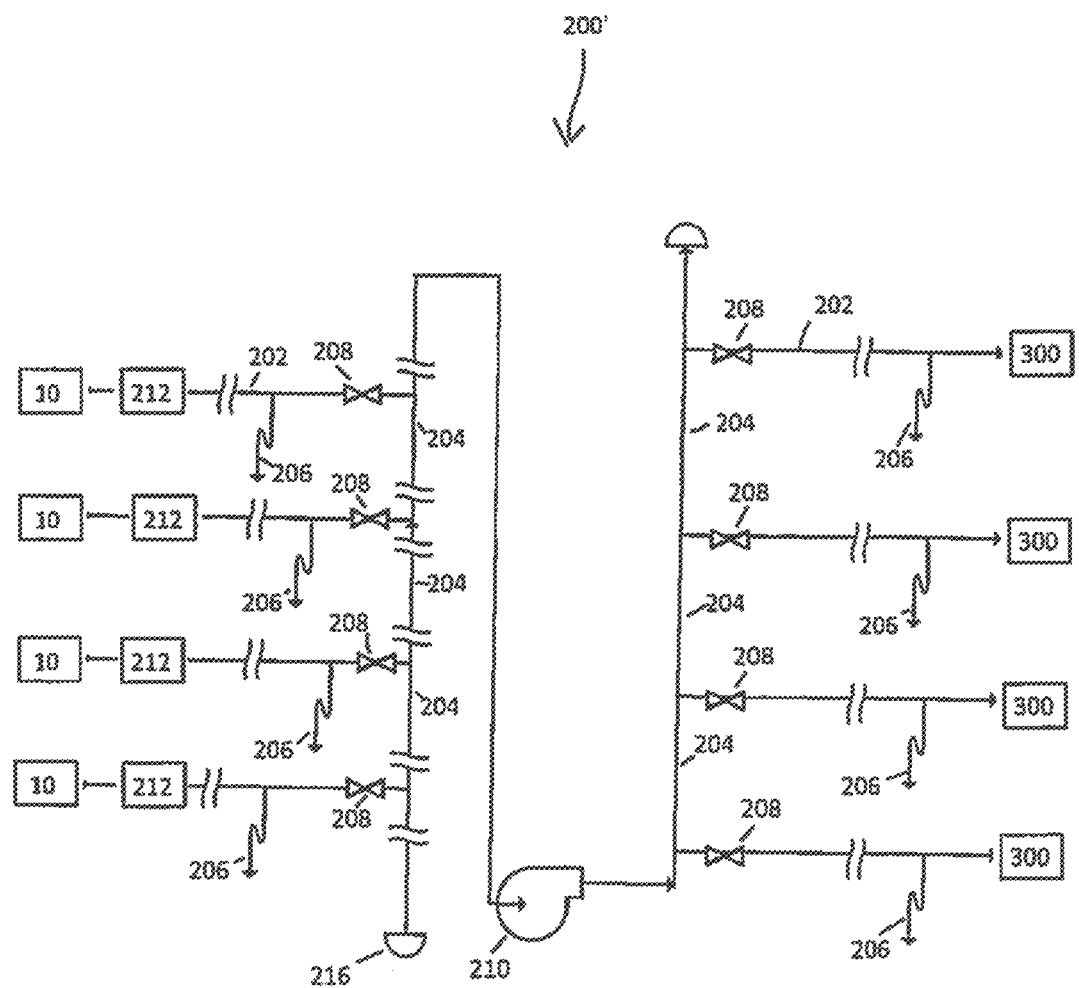
FIG. 2A shows an alternative to FIG. 2 of a flue gas receiving station which includes duct banks and a booster blower and associated connections.
Figure 2B:
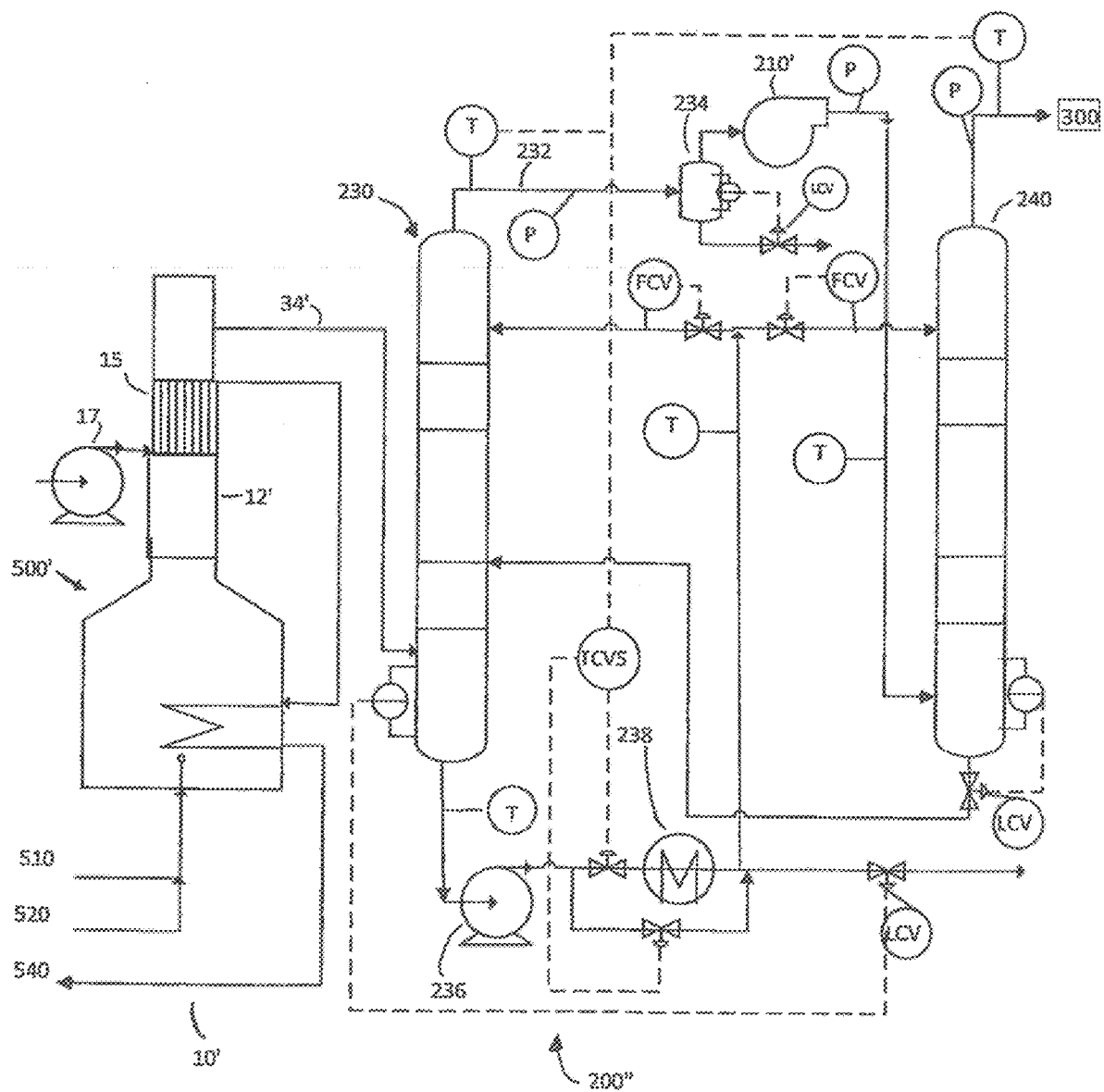
FIG. 2B depicts an alternative embodiment to the flue gas generator and flue gas receiving station depicted in FIGS. 1 and 2.

As further depicted in FIG. 2B, an embodiment of flue gas generator 500' may comprise economizer 15. Economizer 15 is heat exchanger which saves on fuel gas by preheating boiler feed water from ambient temperature on the tube side up to approximately 200 degrees Fahrenheit, utilizing hot stack gas on the shell side. Economizer 15 also reduces stack gas temperature. When economizer 15 is utilized, a boiler feed water pump 17 is also utilized. This embodiment will also comprise a steam discharge line 540. While there is a small pressure drop across economizer 15, venting stack 12' is otherwise opened to the atmosphere. In this embodiment, substantially all of the gas stream flowing through venting stack 12' is discharged through an upper conduit 34' to either flue gas receiving station 200, 200', or 200". While FIG. 2B depicts all flow to flue gas receiving station 200", which comprises one or more flue gas quench columns, it is to be appreciated that flow from a flue gas generator 500' as configured in FIG. 2B may also be directed to flue gas receiving station 200, and 200'.

It is to be appreciated that because of atmospheric or near atmospheric pressure of the extracted gas, the materials utilized for first conduit 22, second conduit 30, third conduit 34 and main duct 24 may be relatively light weight material, but capable of withstanding elevated temperatures. Main duct 24 may have a single diameter size smaller than, equal to, or even greater than the venting stack 12 or manifold into multiple smaller diameter laterals 202 for transport of the gas to flue gas receiving station 200, 200'. Depicted in FIG. 2A are smaller sized than the stack diameter ducting (described later and shown in detail as round robin pipe branching or RRPB in FIG. 4) which may be installed in a duct bank 212 (described later and shown in detail on FIG. 4A.) The multiple smaller sized diameter ducting in the duct bank 212 provide the advantage of higher external surface area than a single large duct to facilitate increased cooling and condensation by contact of the outside of the ducting with ambient air.

Valves 36 shown in FIG. 1 indicate valves for isolation or proportionating streams from first conduit 22, second conduit 30, or third conduit 34 into main duct 24. Similarly isolation and proportionating among streams is achieved with valves 208 shown in FIGS. 2, 2A in laterals 202 and headers 204, and with valves 304 shown in FIG. 3 in laterals 306 and their headers. These valves may be low-pressure-drop light-weight butterfly and/or wafer valves suitable for the operating and design conditions of the process. These valves can be manually operated with devices from grade or at platforms nearby the valves, or automatically controlled by concentration, temperature, flow, or other process condition monitoring devices.

Embodiments of the invention may have a flue gas receiving station 200, 200', 200" as depicted in FIGS. 2, 2A, 2B. Flue gas receiving station 200, 200', 200" receives a gas or gas mixture (which may be composes of any one of L1, L2, L3, I1, I2, I3, U1, and/or air from FIG. 1) through main duct 24 of the flue gas generator system 10, where the gas or gas mixture comprises a diluted and cooled flue gas from the flue gas capture apparatus described above. The gas receiving station 200, 200' may comprise ducting member laterals 202 and ducting member headers 204, which will typically be fashioned from light-weight materials given the very near atmospheric low internal pressure of the flue gas process stream condition. Therefore, the light weight ducting members 202, 204 may be hung off common poles, where the light weight ducting members 202, 204 extend for lengths ranging from under a hundred feet to several miles in length.

Laterals 202 typically have manometric traps 206 located at appropriate spacing and at all low points to facilitate water condensate drainage as the gas cools. The manometric traps 206 are common "P-Trap" devices with snake shaped piping to facilitate collection of a manometric leg of water to trap the flue gas. This manometric leg of liquid water should be monitored and replenished if necessary to prevent excessive leakage of flue gas. The traps may also be monitored with local or automated level indication and controlled using automated valves at the exit tip of the trap to indicate and assure that a level is maintained within the trap.

Flue gas receiving station 200, 200' may further comprise one or more butter fly/wafer valves 208 for isolation and/or proportionation as described above.

Figure 4:
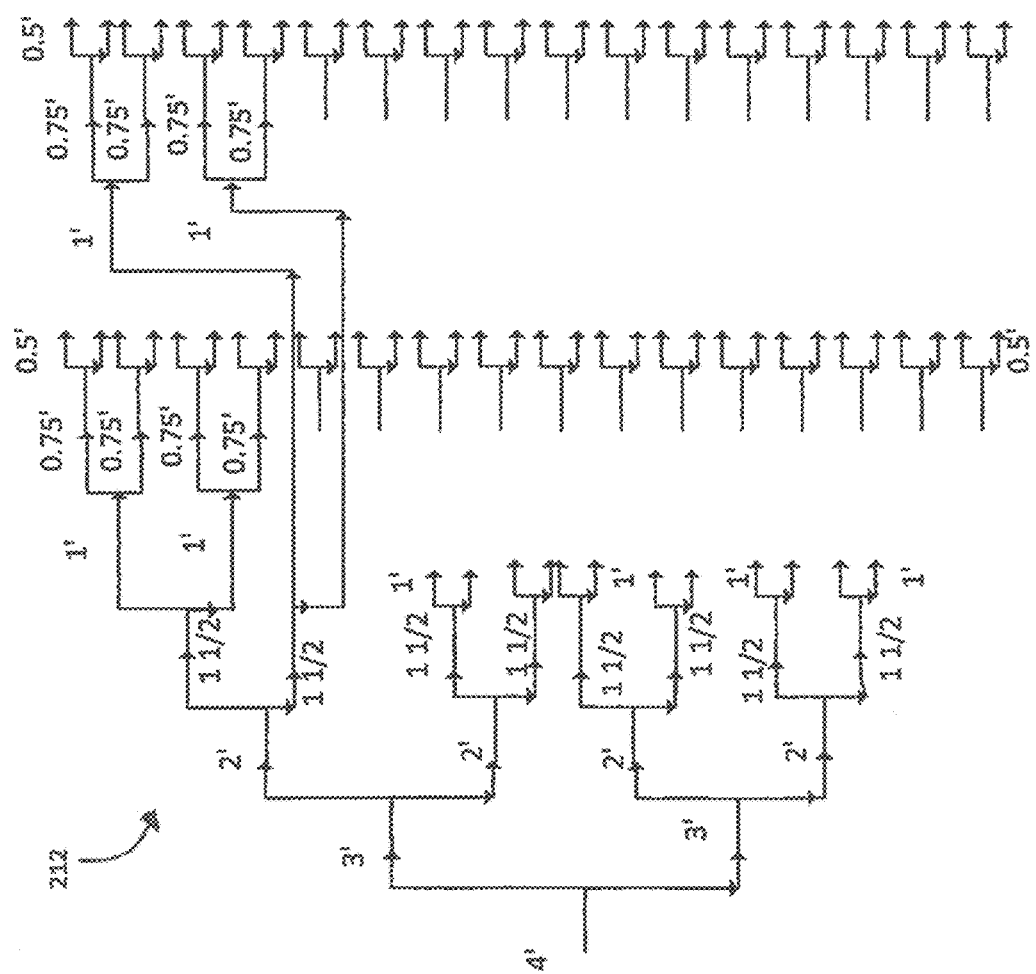
FIG. 4 depicts a detailed view of an example of a configuration of round robin pipe branching which may be utilized for cooling the carbon dioxide flue gas mixture.
Figure 4A:
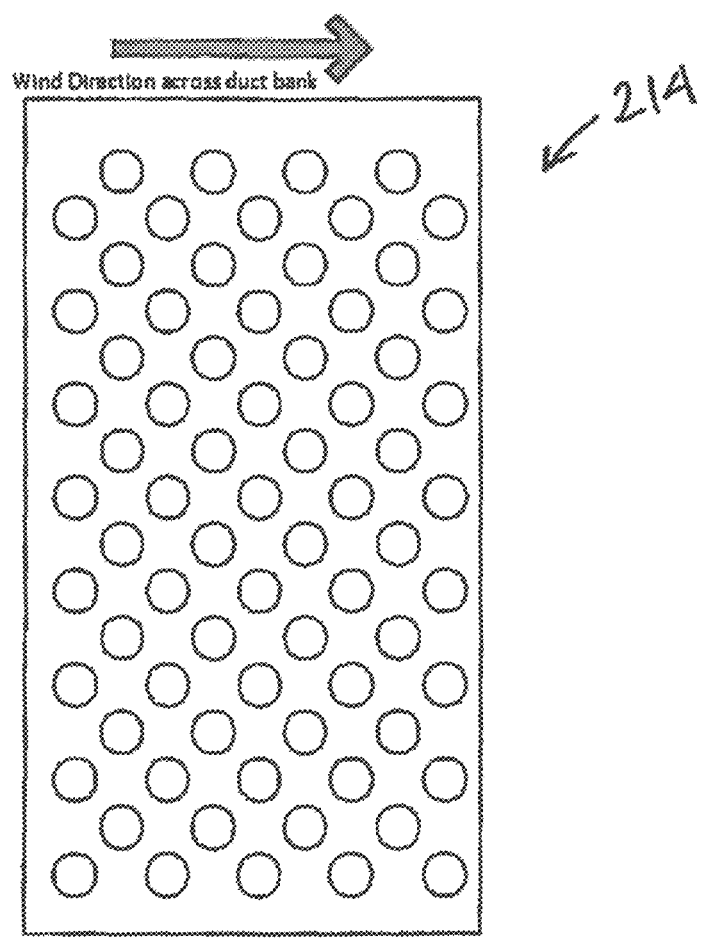
FIG. 4A depicts a configuration of a duct bank within a spacer sheet which may be utilized in cooling the carbon dioxide flue gas mixture.

The embodiment depicted in FIG. 2A may further comprise blower 210 and a duct bank 212, described above and further below and shown in detail in FIGS. 4 and 4A. Blower 210 may become necessary depending upon the length of piping and required by hydraulics.

In situations where the flue gas generator is close to the agricultural field, the embodiment of the invention depicted in FIG. 2B may be applicable. In this embodiment, flue gas source 500' comprises an economizer of flue gas receiving station 200" is specifically suited for close coupled flue gas generators and agricultural fields. The embodiment depicted in FIG. 2B may further comprise a flue gas source 500' with an economizer Flue gas processed through flue gas receiving stations 200, 200' may be enriched with additional carbon dioxide and/or have nutrients added to it through a variety of locations in the ducting, such as at tees disposed adjacent to valves 208 or access caps 216 on ducting member headers 204.

Figure 3:
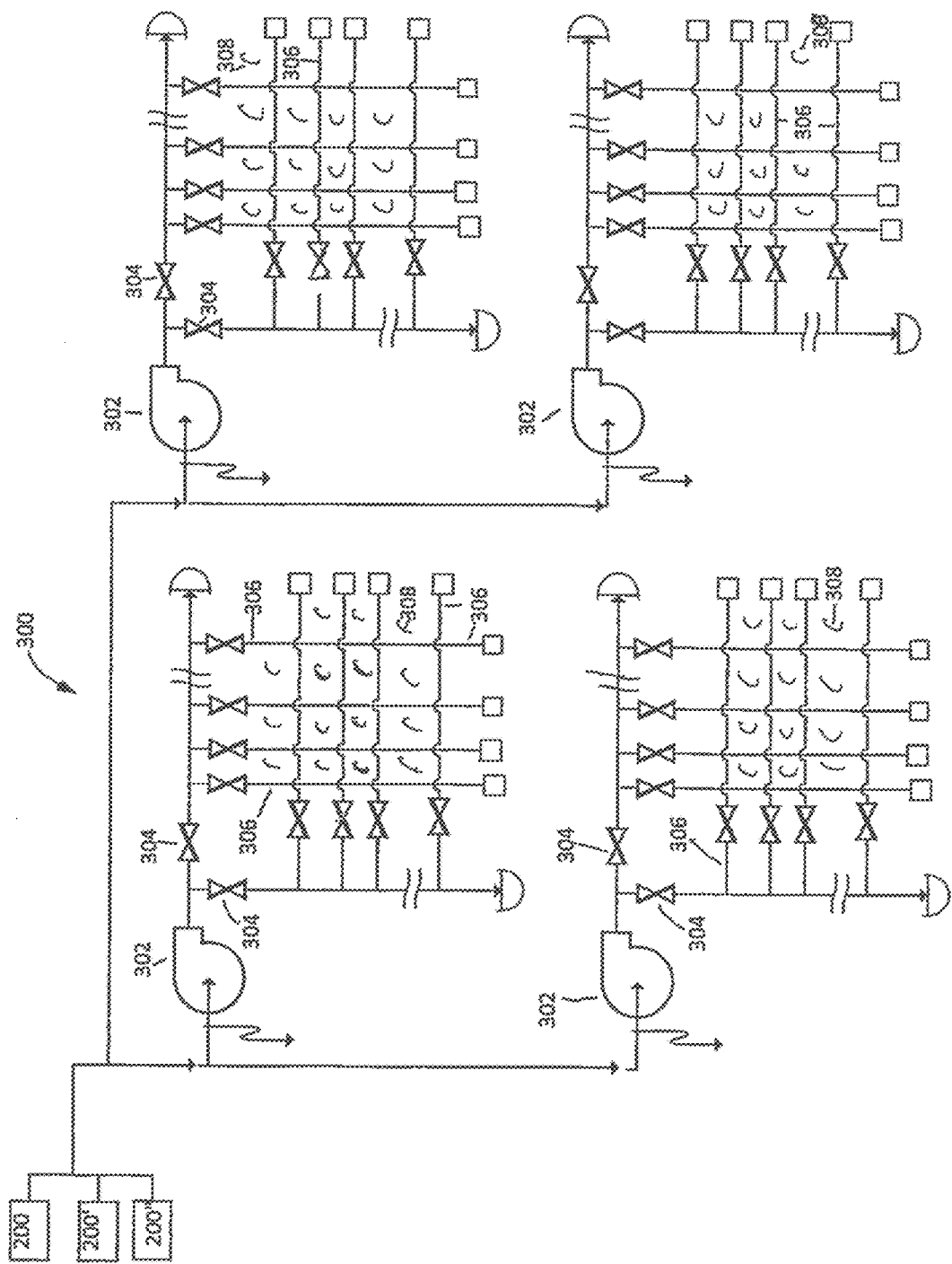
FIG. 3 depicts an embodiment of a local distribution system for distributing cooled carbon dioxide to one or more field arrays for release in the vicinity of the crops.

As exemplified by FIG. 3, embodiments of the invention have a distribution array system 300 which is disposed in one or more agricultural fields utilized for growing plants. The distribution array system 300 may comprise a blower 302, valves 304 and plurality of gas emission lines 306, such as perforated tubing and/or emitters through which the gas or gas mixture may be selectively discharged amidst the plants 308 upon activation of one or more of the valves. It is to be appreciated that as a gas stream flows through the components of the system, including flow through a controlled, selective discharge, the gas stream cools to a temperature which is sufficiently low to be safely administered to the plants. As the gas stream cools, condensation occurs and the moisture content decreases, and liquid water condensate is collected and drained from the system.

The gas mixture may be discharged through a network of emission lines 306 set amongst plants 308 in a field thus providing a warm moist carbon-dioxide enriched micro-environment around the plants. Through photosynthesis the plants 308 convert the carbon-dioxide to glucose and oxygen. Thus, embodiments of the disclosed system utilize the captured carbon dioxide, as well as the elevated (with respect to ambient conditions) humidity and temperature, for a beneficial purpose.

In FIG. 3, blowers 302 draw cooled, diluted, dewatered, possibly pressure/flow boosted flue gas from the flue gas distribution system as required. Blowers 302 may be smaller than blower 210 depicted in FIG. 2A and blower 201' depicted in FIG. 2B. Blowers 302 may be solar powered blowers. Blowers 302 may not be necessary for an embodiment of the flue gas receiving station 200" as depicted in FIG. 2B.

Blowers 302 feed an array of ducting headers and laterals as shown with valves 304 distribute the flue gas through laterals with perforations. These array laterals supply diluted, cooled, dewatered flue gas to desired temperatures, moisture levels, and CO2 concentrations, which may be manually manipulated or automated. Valves 304 may be manipulated according to changes in environmental conditions such as wind speed and direction, or lack of wind altogether to accomplish optimal cooling/dilution/distribution/use of the flue gas exiting the array in the midst of the local field by virtue of release to ambient atmosphere in the vicinity of the flora desired to be enhanced.

On FIG. 2A, large ducting laterals 202, with or without duct spacers 214 (shown on FIG. 4A) can be manifolded or round robin branch piped (RRBP) into multiple smaller sized diameter ducting as shown in FIG. 4, into what is collectively referred to as duct banks 212 on (FIGS. 2A, 4, and 4A). These configurations of multiple smaller sized ducting can be bundled and/or spaced and/or arranged into banks. The duct banks 212 may include duct spacer sheets 214, shown in detail in FIG. 4A (i.e., a perforated plate), which holds the ducting at a prescribed distance and at a prescribed orientation as detailed in FIG. 2A. FIG. 4A depicts a layout which may comprise 64 count of 6" (0.5') duct in a spacer sheet. This configuration may be installed every 20 foot length of duct to make duct banks with spacers.

The smaller sized ducting can be manifolded or round-robined back into a single larger sized ducting or lateral as shown as leaving the duct bank 212 shown in FIG. 2A. In the embodiment shown in FIG. 2A, including the duct banks depicted in FIG. 4, improved ambient cooling is achieved from the increased area in the banks of multiple smaller diameter ducts. Round robin pipe branching or channel (manifold) boxes can be used to make the duct bank from the largest stack dimension lateral. The sizes indicated in FIG. 4, provided for exemplary purposes only, provide an acceptable number of smaller sized duct to achieve equivalent pressure drop. For example, if the diameter of the stack is 4', use 64 count of selected smaller diameter duct of 0.5' as illustrated in FIG. 4. As another example, for a 2' stack, use 8 count of selected smaller diameter duct of 0.75'. The RRPB reverses to rejoin to the stack dimension lateral.

The embodiment of flue gas receiving station 200" depicted in FIG. 2B comprises a first quench column 230 and a second quench column 240. Quench column 230 utilizes direct contact with cooled quench water heat exchange to cool hot stack gas fed into the quench column through upper conduit 34'. The number of stages in quench column 230 may be varied according to the cooling requirements. As depicted in FIG. 2B, the quench water may be recirculated through first quench column 230 and second quench column 240 by utilizing quench water pump 236. Quench water may be cooled with quench water cooler 238. Quench water may also be discharged for crop irrigation.

By way of example, hot flue gas may enter first quench column 230 at a temperature of approximately 400 degrees Fahrenheit and may be cooled to a temperature range of 80 to 110 degrees by first quench column 230. Cooled flue gas exits first quench column 230 through outlet 232 and into condensate knock-out drum 234. Blower 210' may be utilized to boost the pressure of the flue exiting first quench column 230 for inputting into either second quench column 240, or into distribution array system 300, depending upon the ambient temperature and particular application. Second quench column 240, if required, cools the gas discharged from blower 210', which will have a higher temperature as a result of flow through the blower.

For embodiments of the present invention, natural gas is the preferred fuel, because trace components from combustion, such as Nitrogen Oxides (NO, NO2, N2O) and volatile organic compounds, especially ethylene and propylene, are inherently low with conversion efficiencies controlled by regulatory agencies to within acceptable limits, a plus for crop carbon enrichment. With fuels other than natural gas, conversion to these trace components may need to be controlled (eg. with cold flame burner or catalytic converter) to within acceptable limits. Similarly, for solid fuels, such as coal and biomass, trace particulates and other contaminants are removed with conventional treatment devices per regulatory agency requirements.

FIG. 5 provides additional detail regarding a configuration of the lower or intermediate gas extraction device 26 which may be utilized in the invention, along with supporting structure for the depiction of an embodiment of the lower or an intermediate extraction device and supporting the same. Intermediate gas extraction device 26 may be supported by a roof 540 of the flue gas generator 500. If the venting stack 12 is the stack base 14 (as shown in FIG. 1), then this is a lower extraction device. If the venting stack 12 is a full pipe section 16 (as shown on FIG. 1) then this is an intermediate extraction device. If the venting stack 12 is close-ended or capped, a gap 50 or other opening may be utilized to draw in atmospheric air into intermediate gas extraction device 26 to form the dilution gas.

FIG. 6 provides additional detail regarding a configuration of the upper extraction device 32, which may be disposed across the top of stack tip 28 with optionally attaching a partial pipe section 18 (not shown) extending above the upper extraction device 32. Upper extraction device 32 may be configured as a half-pipe with the open facing downward across stack tip 28, and partial pipe section 18 extending above the upper extraction device. End 52 of upper extraction device 32 may be attached to third conduit 34 (not shown in FIG. 6).

While the above is a description of various embodiments of the present invention, further modifications may be employed without departing from the spirit and scope of the present invention. Thus the scope of the invention should not be limited according to these factors, but according to the following appended claims.

What is claimed is:

1. A system for extracting all, or a portion, of a carbon dioxide bearing flue gas stream emitted from a venting stack of a stationary flue gas generator and utilizing the carbon dioxide from the flue gas stream to enhance the health and productivity of a plurality of plants, the system comprising:
   a gas extraction device configured to receive at least a portion of the flue gas stream flowing through the venting stack and direct the at least a portion of the flue gas into a first conduit connected to the gas extraction device;
   a first flue gas quench column connected to the first conduit, the flue gas quench column directing a flow of quench water into direct contact with the at least a portion of the flue gas stream, resulting in a cooled stream of flue gas;
   a gas distribution manifold connected to the first flue gas quench column, the gas distribution manifold receiving the cooled stream of flue gas, the flue gas distribution manifold comprising at least one manometric trap for water condensate drainage from the cooled stream of flue gas resulting in a dewatered cooled stream of flue gas; and
   a distribution array connected to the gas distribution manifold, the distribution array receiving the dewatered cooled stream of flue gas, the distribution array disposed in a field comprising the plurality of plants, the distribution array comprising a blower, a valve and plurality of gas emitters through which at least a portion of the dewatered cooled stream of flue gas may be selectively discharged amidst the plurality of plants upon activation of the valve.

2. The system of claim 1 wherein a dewatering drum is disposed between the first quench column and the gas distribution manifold.

3. The system of claim 2 wherein a blower is disposed between the dewatering drum and the gas distribution manifold.

4. The system of claim 3 wherein a second flue gas quench column is disposed between the blower and the gas distribution manifold.

5. The system of claim 1 wherein the venting stack comprises a heat exchanger which utilizes the flue gas stream to heat a stream of water flowing through the heat exchanger.

6. A method for capturing carbon dioxide from a flue gas stream emitted from a venting stack of a stationary flue gas generator comprising the following steps:
   receiving at least a first portion of the flue gas stream flowing through the venting stack into a first flue gas quench column connected to the venting stack;
   directing a flow of quench water into the first flue gas quench column to directly contact the at least first portion of the flue gas stream, resulting in a cooled stream of flue gas;
   dewatering the cooled stream of flue gas, resulting in a dewatered cooled stream of flue gas; and
   distributing the dewatered cooled stream of flue gas through a distribution array disposed in a field comprising a plurality of plants.

7. The method of claim 6 wherein the dewatered cooled stream of flue gas flows through a blower prior to entering the distribution array.

8. The method of claim 7 comprising the further step of directing a pressurized flue gas stream from the blower into a second flue gas quench column wherein flow from the second flue gas quench column is directed to the distribution array.

* * * * *